United States Patent Office.

ASAHEL K. EATON, OF PIERMONT, NEW YORK.

Letters Patent No. 103,312, dated May 24, 1870; antedated May 7, 1870.

IMPROVEMENT IN TOOLS AND WHEELS FOR CUTTING AND POLISHING IRON, STEEL, AND OTHER MATERIALS.

The Schedule referred to in these Letters Patent and making part of the same.

To all whom it may concern:

Be it known that I, ASAHEL K. EATON, of Piermont, in the county of Rockland and State of New York, have invented certain new and useful Improvements in the Manufacture of Tools, Implements, and other Articles used for Cutting, Grinding, Shaping, and Polishing Iron, Steel, Glass, Precious Stones, Grain, or other substance, in place of emery, emery-wheels, hones, grindstones, mill-stones, and the like; and I do hereby declare the following to be such a full, clear, and exact description of the same as will enable one skilled in the arts to which my invention appertains to make and use the same.

My invention consists in the manufacture of tools, implements, and other articles for any or either of the purposes aforesaid, of alumina, as the main element, mixed with water and clay or other plastic material or cement, of suitable texture or nature to be united with the alumina, and bake in a hard refractory mass, when submitted to a high heat, after being pressed into the desired shape in suitable molds.

In the practice of my invention, I proceed as follows, that is to say:

I take four parts of anhydrous alumina and one part of fire-clay, by weight, and thoroughly mix the two together with just water enough to make a plastic mass of uniform consistency. This material I compress into suitable molds, by means of a press of suitable construction and power. I then take the article out of the mold, and subject it to a full white heat in some suitable kiln, oven, or retort. The article is then allowed to slowly cool, after which it is ready for use.

Any of the various kinds of clay may be used, but the more refractory the clay the higher should be the heat used in baking the article.

The proportion of clay and alumina may be varied, but the less clay used the harder will be the article produced.

In the manufacture of stones, wheels, or tools, of coarse grain or texture, to cut rapidly in coarse work, or for the purpose of coarse mill-stones, I proceed to make the mixture above described, and put it into shapes of any convenient form, and submit it to a high heat in a suitable furnace, after which I crush it as finely as desired, producing a sort of artificial emery-powder, of any required coarseness. I then proceed to make the article, as before, of the baked powdered alumina and clay.

The artificial emery-powder produced as stated may be used for all the purposes to which native emery is applied, and may be made into wheels or other form by means of glue, shellac, or caoutchouc, as in the case of native emery.

In the manufacture of large grinding apparatus, such as mill-stones, for example, it is only necessary to make the surface of the stone of this mixture, making the body of any material of the necessary strength and weight.

Having now described the nature and extent of my invention,

I claim as new herein, and desire to secure by Letters Patent—

Manufacturing tools, wheels, implements, and other articles, for the purpose aforesaid, of alumina, treated and combined substantially as herein described.

A. K. EATON.

Witnesses:
AMOS BROADNAX,
GEORGE M. SCOLLAY.